US006942186B1

(12) United States Patent
Levin et al.

(10) Patent No.: US 6,942,186 B1
(45) Date of Patent: Sep. 13, 2005

(54) METHOD AND APPARATUS FOR PROPULSION AND POWER GENERATION USING SPINNING ELECTRODYNAMIC TETHERS

(75) Inventors: Eugene M. Levin, Minnetonka, MN (US); Joseph A. Carroll, Chula Vista, CA (US)

(73) Assignee: Star Technology and Research, Inc., Mount Pleasant, SC (US)

( * ) Notice: Subject to any disclaimer, the term of this patent is extended or adjusted under 35 U.S.C. 154(b) by 0 days.

(21) Appl. No.: 10/092,214

(22) Filed: Mar. 5, 2002

Related U.S. Application Data

(60) Provisional application No. 60/274,072, filed on Mar. 7, 2001.

(51) Int. Cl.[7] ................................................. B64G 1/32
(52) U.S. Cl. ..................... 244/158 R; 244/172; 244/166
(58) Field of Search ............................ 244/158 R, 172, 244/166

(56) References Cited

U.S. PATENT DOCUMENTS

| | | | |
|---|---|---|---|
| 3,582,016 A | 6/1971 | Sherman | |
| 3,695,103 A | 10/1972 | Olson | |
| 3,868,072 A | 2/1975 | Fogarty | |
| 4,097,010 A | 6/1978 | Colombo et al. | |
| 4,580,747 A | 4/1986 | Pearson | |
| 4,727,373 A | 2/1988 | Hoover | |
| 4,824,051 A | 4/1989 | Engelking | |
| 4,923,151 A | 5/1990 | Roberts et al. | |
| 5,082,211 A | 1/1992 | Werka | |
| 5,163,641 A | 11/1992 | Yasaka | |
| 5,183,225 A | 2/1993 | Forward | |
| 6,116,544 A | 9/2000 | Forward et al. | |
| 6,173,922 B1 | 1/2001 | Hoyt et al. | |
| 6,260,807 B1 | 7/2001 | Hoyt et al. | |
| 6,286,788 B1 | 9/2001 | Hoyt et al. | |
| 6,290,186 B1 | 9/2001 | Hoyt et al. | |
| 6,345,789 B1 * | 2/2002 | Rasmusson | 244/172 |
| 6,386,484 B1 * | 5/2002 | Hoyt et al. | 244/172 |
| 6,565,044 B1 * | 5/2003 | Johnson et al. | 244/172 |
| 6,732,978 B2 * | 5/2004 | Ockels et al. | 244/172 |

OTHER PUBLICATIONS

Anselmo, J.C., "NRO Orbiting Spacecraft Studies Tether Survivability", *Aviation Week & Space Technology*, Jul. 1, 1996, p. 24.
Barry, P., "A Little Physics and a Lot of String", *NASA Science News*, Jun. 9, 2000, http://science.msfc.nasa.gov.
Bekey, I., "Tethering a new technique for payload deployment", *Aerospace America*, Mar., 1997, pp. 36–40.
Bekey, I., "Tethers Open New Space Options", *Astronautics & Aeronautics*, Apr., 1983, pp. 33–40.

(Continued)

*Primary Examiner*—Michael J. Carone
*Assistant Examiner*—Lulit Semunegus
(74) *Attorney, Agent, or Firm*—Dicke, Billig & Czaja, PLLC

(57) ABSTRACT

The present invention improves the orbital maneuvering and power generation capabilities of a system of a satellite(s) connected with a conducting tether(s) by spinning the system about its mass center at an angular rate which is relatively high compared to the average orbital rate. An improvement in tether performance is achieved because at many times during rotation the tether is positioned at much better angles with the magnetic field and significantly higher currents are driven through the tether without destabilizing the system. The current can flow either in the direction of the EMF induced in the tether, or in the reverse direction, depending on the tether orientation with respect to the magnetic field and the mission goals. The reverse current is driven by the onboard power sources. Spinning electrodynamic tether systems can also be lighter and simpler in design and more flexible in operation.

45 Claims, 5 Drawing Sheets

OTHER PUBLICATIONS

Carroll, J.A., "SEDS Deployer Design and Flight Performance", paper WSEDSA-1 at the 4$^{th}$ International Conference on Tethers in Space, Apr., 1995, pp. 593–600, Washington, D.C.

Cheek, D., "Failure–Resistant Multiline Tethers", *NASA TechFinder: Tech Brief*, Apr., 2000, p. 50, vol. 24, Issue 4 (found on Internet at http://technology.nasa.gov).

Cheek, D., "Using Electromagnetic Drag on Tethers to De–Orbit Spacecraft", *NASA TechFinder: Tech Brief*, Mar., 2000, p. 75, vol. 24, Issue 3 (found on Internet at http://technology.nasa.gov).

Dooling, D., "Plugged in to space", *NASA Science News*, Oct. 15, 1998, http://science.msfc.nasa.gov.

Dooling, D., "Setting Sail for the Stars", *NASA Science News*, Apr. 8, 1999, http://science.nasa.gov.

Dooling, D., "Spacecraft may fly on 'empty' using propulsive tether concept", *NASA Science News*, Jan. 22, 1999, http://science/nasa/gov.

"Electronic Technologies Sought for Orbital Debris Tether", *Space Business News*, Jun. 9, 1999, vol. 17, No. 12, Phillips Business Information, Inc.

Flinn, E.D., "Tethers for tidying up space", *Aerospace America*, Jan., 1999, p. 28, American Institute of Aeronautics and Astronautics, Inc.

Forward, R.L., et al., "Failsafe Multiline Hoytether Lifetimes", *31$^{st}$ AIAA/ASME/SAE/ASEE Joint Propulsion Conference*, Jul. 10–12, 1995, AIAA 95–2890, San Diego, California, American Institute of Aeronautics and Astronautics, Washington, D.C.

Forward, R.L., *Failsafe Multistrand Tethers for Space Propulsion*, Final Report on NASA Contract NAS8–39318 SBIR 91–1 Phase I, Jul., 1992, Forward Unlimited, Malibu, California.

Forward, R.L., "Failsafe Multistrand Tether Structures for Space Propulsion", *AIAA/SAE/ASME/ASEE 28$^{th}$ Joint Propulsion Conference and Exhibit*, Jul. 6–8, 1992, Nashville, Tennessee, American Institute of Aeronautics and Astronautics, Washington, D.C.

Gallagher, D.L., et al., *Electrodynamic Tether Propulsion and Power Generation at Jupiter*, NASA/TP–1998–208475, Jun., 1998.

Heinen, G.W., et al., *Progress on Development of the Terminator Tether™*, Jan. 2, 2002, http://sli.nasa.gov/ast/abstracts.

"High Strength–to–Weight Tapered Hoytether for LEO to GEO Payload Transport", *NASA TechFinder*, Jul. 24, 2001, http://technology.larc.nasa.gov.

Johnson, L., et al., "Electrodynamic Tethers for Spacecraft Propulsion", *36$^{th}$ Aerospace Sciences Meeting & Exhibit*, Jan. 12–15, 1998, Reno, Nevada, Paper AIAA 98–0983, American Institute of Aeronautics and Astronautics, Reston, VA.

Johnson, L, "Propulsive Small Expendable Deployer System Mission (ProSEDS)", *Proceedings of the OAST 8$^{th}$ Advanced Propulsion Workshop*, JPL, Pasadena, California, May 20–22, 1997.

"A Lightweight System for End–of–Life Deorbit of Low–Earth–Orbit Spacecraft", *SBIR Success Stories*, Dec. 28, 2001, Technology Transfer Program, Marshall Space Flight Center (found on Internet at http://techtran.msfc.nasa.gov).

Lorenzini, E.C., *In–Space Transportation with Tethers*, Sep., 1999, Smithsonian Institution, Astrophysical Observatory, Cambridge, Massachusetts.

Malone, J., "Tethered Transportation in Space", *Marshall Space Flight Center News Releases*, Mar. 26, 1999, (found on Internet at http://www.msfc.nasa.gov).

McCoy, J.E., et al., "Plasma Motor–Generator (PMG) Flight Experiment Results", *Proceedings of the 4$^{th}$ International Conference on Tethers in Space*, Apr., 1995, pp. 57–82, Washington, D.C.

"NASA advanced concepts to be described in Thursday session", *Aerospace Daily*, Mar. 23, 1999, p. 425, vol. 189, No. 55, The McGraw–Hill Companies, Inc.

Penzo, Dr. P.A., et al., Ed., *Tethers In Space Handbook—Second Edition*, May, 1989, NASA Office of Space Flight, NASA Headquarters, Washington, D.C.

Raitt, W.J., et al., "The NASA/ASI TSS–1 Mission: Summary of Results and Reflight Plans", *Proceedings of the 4$^{th}$ International Conference on Tethers in Space*, Apr., 1995, pp. 107–118, Washington, D.C.

Root, J., "Removing Space Debris from LEO", *Aerospace Technology Innovation*, May/Jun. 2000, vol. 8, No. 3 (found on Internet at http://www.nctn.hq.nasa.gov/innovation/Innovation).

Schmidt, G., "Nuclear and future flight propulsion", *Aerospace America*, Dec., 2000, p. 54, American Institute of Aeronautics and Astronautics, Inc.

\* cited by examiner

METHOD AND APPARATUS FOR PROPULSION AND POWER GENERATION USING SPINNING ELECTRODYNAMIC TETHERS

CROSS-REFERENCE TO RELATED APPLICATIONS

This application claims the benefit of the filing of U.S. Provisional Patent Application Ser. No. 60/274,072, entitled "Method and Apparatus for Propulsion and Power Generation Using Spinning Electrodynamic Tethers," filed on Mar. 7, 2001, and the specification thereof is incorporated herein by reference.

GOVERNMENT INTEREST

This invention was made with Government support under Government Contract No. F29601-00-C-0034 awarded by the United States Air Force. The Government has certain rights in the invention.

BACKGROUND OF THE INVENTION

1. Field of the Invention (Technical Field)

The present invention relates to orbital propulsion and power generation systems, and, more particularly, to a method and apparatus of using a spinning (fast-rotating) conducting tether to produce an electrodynamic propulsion force to change the orbit of a satellite through the interaction between the electric current in the tether and the external magnetic field or to produce electric power using electromotive force in the tether.

2. Background Art

Space tethers have attracted a lot of attention in the past 40 years. Many researchers have contributed to the theory of tether behavior in orbit. The theory has been applied and proved in a number of flights involving tethers attached to spacecraft.

In 1966, Gemini 11 and 12 manned spacecraft were attached with a tether to a rocket stage and demonstrated libration and rotation modes of tethered motion.

In 1992, TSS-1, the Shuttle-based Tethered Satellite System, including a 550-kg satellite and a 20-km electrically conductive tether, was partially deployed from the Shuttle orbiting at an altitude of 296 km. The measurement of the voltage-current profiles shed new light on electric behavior of conducting tethers in orbit.

In 1993, SEDS-I, the Small Expendable Deployment System, including a 26-kg mini-satellite on a 20-km non-conductive tether, was successfully deployed downward from a Delta rocket second stage. SEDS-I was a flight experiment to test the deployment of a long tether by means of a light and simple deployment mechanism and the deorbit and reentry of the mini-satellite after the release of the tether from the Delta stage. It was the longest structure (20 km) ever deployed in orbit.

Also in 1993, PMG, the Plasma Motor Generator, including a 500-m-long electrodynamic tether, was deployed from the Delta second stage with the primary goal of testing power generation and thrust by means of an electrodynamic tether. This mission was the first example of a propulsion system for space transportation that did not utilize any propellant, but rather achieved propulsion by converting orbital energy into electrical energy (deorbit) or electrical energy into orbital energy (orbit boosting).

In 1994, SEDS-II, the Small Expendable Deployment System (second flight), with the same equipment of SEDS-I, was utilized for a longer and more ambitious mission. The system was stabilized along the local vertical at the end of deployment and kept attached to the Delta stage to study the acceleration environment and, during the extended mission phase, the survivability of a thin tether to micrometeoroid impacts. During the extended mission phase, SEDS-II also provided important data on the micrometeoroid risk as the tether was cut at the 7-km point three days after the completion of the one-day primary mission.

In 1996, TSS-1R, a reflight of TSS-1 was attempted. The mission was terminated before due time by an electrical arc that severed the tether just before the end of deployment. Nevertheless, it was an important mission for tethered satellites because it showed that the electrodynamic tethers were more efficient that theoretically predicted, providing valuable data on electric performance of the system.

In 1996, TiPS, the Tether Physics and Survivability Experiment, including a 4-km-long passive tethered system for the investigation of the long-term survivability of tethers in the space environment, was successfully started. This system proved that a sufficiently fat tether can survive for a very long time the harsh space environment, and also provided valuable data on the long-term passive internal damping of tether librations.

In 1996, the Advanced Tether Experiment (ATEx) began deployment in orbit. About 18 minutes into deployment, at a deployed length of only 22 meters, the tether went slack, bent, and triggered several tether departure angle optical sensors. This led to the tether experiment being automatically ejected, to protect the host vehicle. The slackness occurred just after sunrise any may have resulted from a thermal transient on the thin polyethylene tape tether.

In 2002, ProSEDS, the Propulsive Small Expendable Deployer System, will deploy 10 km of Dyneema tether followed by 5 km of bare wire from a Delta-II stage to test the electrodynamic propulsion capabilities of the tether.

"Tethers in Space Handbook," Second Edition, NASA Office of Space Flight, NASA Headquarters, Washington, D.C., 1989, edited by P. A. Penzo and P. W. Ammann, provides summaries of various applications and features of space tethers, including methods to change orbital elements with electrodynamic tether propulsion and methods to control the attitude dynamics of such tethers. The basic concept is to vary the electric current in the tether based on the estimate of the tether state obtained from measurements of certain tether system parameters. It is noted on p. 8 of the Handbook that the electrodynamic tether of the Plasma Motor Generator (PMG) deployed from the Shuttle orbiter to conduct plasma physics experiments may be centrifugally stabilized by rotation at 15 revolutions per orbit, while the operation in this mode is not described.

The following patents cover certain details of electrodynamic tether usage.

U.S. Pat. No. 6,116,544, entitled "Electrodynamic Tether and Method of Use," issued Sep. 12, 2000, to Forward et al., describes electrodynamic tethers for deorbiting out-of-service satellites. In one embodiment, the tether rotates about the center of mass "to centrifugally produce tension force in the tether", which recites the concept of centrifugal stabilization of an electrodynamic tether, described earlier in the "Tethers in Space Handbook", NASA, 1986. This patent does not disclose design, operational, and performance advantages and methods of use of spinning (fast-rotating) electrodynamic tethers. The '544 Patent claims that the optimal mode of tether operation is non-spinning, with the tether hanging at a certain fixed angle relative to the local vertical.

U.S. Pat. No. 6,260,807, entitled "Failure Resistant Multiline Tether," issued Jul. 17, 2001, to Hoyt et al., discusses various multistrand tethers to improve strength and stability.

U.S. Pat. No. 4,923,151, entitled "Tether Power Generator for Earth Orbiting Satellites," issued Mar. 1, 1988 to Roberts et al., discloses use of an electrodynamic tether as a power generator for earth orbiting satellites.

U.S. Pat. No. 4,824,051, entitled "Orbital System Including a Tethered Satellite," issued Jan. 12, 1987 to Engelking, discloses use of an electrodynamic tether attached to a satellite to compensate for the air drag and the orbit degradation.

U.S. Pat. No. 3,868,072, entitled "Orbital Engine," issued Feb. 25, 1975, to Fogarty, discloses a tether to rotate/revolve one mass about the other and provide energy.

U.S. Pat. No. 3,582,016, entitled "Satellite Attitude Control Mechanism and Method," issued Jun. 1, 1971, to Sherman, is a study about transverse waves and rotational dynamics. It does not disclose electrodynamics or use of magnetic fields.

While most of the early estimates of performance of electrodynamic tethers were based on the so-called "static stability" considerations, when non-stationary processes were ignored, in the recent years, more attention is being paid to "dynamic stability" considerations, when complex non-stationary dynamic response to real perturbations is taken into account.

V. V. Beletsky and E. M. Levin in "Dynamics of Space Tether Systems," Advances in the Astronautical Sciences, v. 83, AAS, 1993, described many modes of inherent instabilities of electrodynamic tethers that are observed even in equatorial circular orbits, and even when dynamic models neglect magnetic field variations along the orbit. They pointed out that it would be virtually impossible to operate electrodynamic tether systems anywhere close to the boundaries of "static stability" because of a very strong, uncontrollable or hardly controllable dynamic instability in these regions. It has been shown in this study that realistic expectations for "safe" electric current levels must be typically lowered by an order of magnitude compared to "static" levels because of dynamic instabilities.

More evidence of rigid dynamic instability constraints was accumulated by others, as more detailed and realistic simulations were performed.

R. P. Hoyt and R. L. Forward in "The Terminator Tether: Autonomous Deorbit of LEO Spacecraft for Space Debris Mitigation," AIAA 00-0329, 38th Aerospace Sciences Meeting & Exhibit, 10–13 Jan. 2000, Reno, Nev., reported that active control had to be applied to copy with dynamic instabilities. The results of their detailed dynamics simulation results showed actual performance levels much lower than described in the '544 Patent based on "static stability" considerations. This was attributed to the dynamic stability constraints.

J. Corsi and L. Less in "Stability and Control of Electrodynamic Tethers for De-orbiting Applications," IAF-00-S.6.06, 51st International Astronautical Congress, 2–6 Oct. 2000, Rio de Janeiro, Brazil, showed that realistically for deorbiting with an electrodynamic tether, the electric current in the tether must be periodically switched off to prevent libration buildup and rotation onset, thus substantially decreasing deorbiting efficiency of the electrodynamic tether.

Stability problems have been also reported by D. L. Gallagher, J. Moore, and F. Bagenal in their study of "Electrodynamic Tether Propulsion and Power Generation at Jupiter", NASA/TP-1998-208475, Marshall SFC, June 1998. At the end of the report, the authors suggested that "a rotating system with two spacecraft connected by a small-to-modest length tether should be investigated" as an alternative configuration for Jovian missions in future research, thus turning to the concept of centrifugal stabilization of an electrodynamic tether described earlier in the "Tethers in Space Handbook", NASA, 1986.

Traditionally, rotation was perceived as a means of creating artificial gravity onboard space stations and an assist in launching and capturing payloads by momentum-exchange tether transportation systems.

It has been noted recently that rotating momentum-exchange transportation systems can be augmented with an electrodynamic tether reboost. R. P. Hoyt in "Design and Simulation of a Tether Boost Facility for LEO-GTO Transport," AIAA Paper 2000-3866, 36th Joint Propulsion Conference, Huntsville, Ala., Jul. 17–19 2000, described a rapidly rotating ultra-long tether transportation facility placed in a highly elliptical equatorial orbit. After a momentum-exchange payload launch, the facility is expected to regain its orbital energy by using electrodynamic thrust at perigee passages as the only way to do this without propellant.

Rotation, however, has been considered detrimental to the performance of conventional electrodynamic tether systems. As noticed by R. P. Hoyt and R. L. Forward in "The Terminator Tether: Autonomous Deorbit of LEO Spacecraft for Space Debris Mitigation," AIAA 00-0329, 38th Aerospace Sciences Meeting & Exhibit, 10–13 Jan. 2000, Reno, Nev., " . . . electrodynamic forces can become quite significant, and without control over the tether dynamics, the instabilities can result in the tether 'flipping over' or even beginning to rotate, with a resultant loss of deorbit efficiency and control over the tether system." As claimed in the '544 Patent cited earlier, the optimal performance of an electrodynamic tether for deorbiting satellites is achieved in a non-spinning mode, with the tether hanging at a certain fixed angle relative to the local vertical.

The present invention teaches an unobvious fact that spinning (fast rotation) is actually very beneficial for performance and design of electrodynamic tether systems. The spinning is presumed fast compared to the orbital revolution.

SUMMARY OF THE INVENTION

The present invention provides a method and apparatus for improving performance and design of electrodynamic tether systems used for propulsion and power generation purposes in orbit.

The present invention teaches that orbital maneuvering and power generation capabilities of a satellite or satellites connected with a conducting and partially or fully insulated tether or tethers are improved by spinning the system about its mass center at an angular rate that is on average at least about two times higher and typically an order of magnitude higher than the average orbital rate. An improvement in tether performance is achieved because at many times during rotation the tether is positioned at much better angles with the magnetic field and significantly higher currents can be driven through the tether without destabilizing the system.

The present invention also teaches that spinning electrodynamics tether systems offer significant design and operational advantages over conventional non-spinning electrodynamic tether systems.

The tether can operate bi-directionally in the sense that the electrical current can flow either in the direction of the EMF induced in the tether, or in the reverse direction, depending on the tether orientation with respect to the magnetic field, mission goals, available power, and other system parameters. The reverse current is driven by onboard power sources. When the current is reversed, the system switches from electron collection at one location along the tether to electron collection at another location, with a similar switching of electron emission. In general, either electron collection, or emission, or both may occur at more than one location along the tether at the same time, to allow better control of the spin dynamics by varying the current path and hence the electromagnetic torque on the tether.

The spin rate and phase, as well as the orientation of the spin axis is controlled by varying the electric current in the tether in such a way as to reach the mission goals. For example, the orientation of the spin axis can be adjusted to increase solar energy collection without requiring two-axis solar array tracking, while the spin rate can be adjusted to provide a desired level of artificial gravity at one or more locations in the tether system.

Spinning can provide centrifugal stabilization of solar arrays, which facilitates the use of lightweight components, like thin-film arrays. At the same time, solar arrays can be rotated about the tether line to increase solar energy collection.

A spinning system can operate without heavy batteries. In sunlight, the power comes from the solar arrays, and in eclipse, it can be produced from the EMF if desired, and because of spinning, there are always favorable orientations of the tether with respect to the magnetic field during each orbit to produce a desired impact on the orbital elements, whether the power is drawn from the solar arrays or the EMF.

A natural approach to the deployment of a spinning system is to spin up the system at or near the beginning of deployment and rely on centrifugal forces to pull the tether out of the deployer storage. To provide a minimum pull-out tension and to prevent a premature deployment, a weak adhesive can be applied to bond the tether turns together. As the system inertia increases with the deployed tether length, the spin rate tends to decrease, reducing centrifugal forces pulling the tether out of the storage. When the tether tension drops below the minimum, deployment stops, giving the system time to spin up again using electrodynamic torques on the tether or cold-gas thrusters, or other means, in order to prevent tether slackness, which can lead to tether fouling or other problems.

The present invention comprises a tether system for space applications comprising at least one spinning electrodynamic tether, conducting electrical current and spinning at least approximately two times faster on average than an orbital revolution with respect to inertial space, distinct electron collection and electron emission means, a power system and an electric control system. The electric control system controls the electric current in the tether to control the spinning and increase average long-term orbit transfer or power generation rates, taking advantage of spinning. The tether system is preferably used for space applications in low Earth orbit below approximately 2000 km.

The spinning electrodynamic tether preferably comprises a multi-strand tether, flattened tether, hollow tether, or thin tape tether. The system is preferably bi-directional, wherein the electric current in the tether can be driven in both directions in some or all segments of the tether.

The tether system comprises at least one or preferably two electron collectors disposed at distinct locations and at least one or preferably two electron emitters disposed at distinct locations. The electron collector can be a net-like collector, or a Hoytether, or a single or multiple tape.

The tether system preferably comprises a solar energy collector, such as a solar array. This solar array may be a thin-film solar array. The solar array can be centrifugally-stabilized.

The tether system preferably comprises an energy storage device, preferably with a capacity to provide energy at least for a portion of a spin and/or a capacity to provide energy for the duration of an eclipse.

The tether system further preferably comprises a deployer. The tether can be stowed in the deployer by being wound on itself (e.g., with turns). The turns are preferably fastened in such a way that a minimum tension is required to unwind the tether turns from the deployer. The turns stored in the deployer can be bound with a weak adhesive, such as vacuum grease. The deployer may provide full or partial retraction of the tether.

One or more segments of the tether may have both ends of a wound segment at an outside of a winding, with the ends exposed and each end attached to a separate object. Both ends may be deployed simultaneously. The tether may consist of two or more sections, which can be wound more densely and stably together than they can be wound separately.

Multiple tethers may be used with the present invention. These tethers can form a configuration, such as a triangle, a polygon, or a polyhedron.

The present invention further comprises a method for operating a spinning electrodynamic tether system comprising: providing a spinning electrodynamic tether; spinning the electrodynamic tether at a rate at least approximately two times higher on average than the orbital angular rate; and controlling the electric current in the tether to thereby control the spinning and increase average long-term orbit transfer or power generation rates, taking advantage of spinning.

The electric current in the tether may be varied as a primary control output. This varying the electric current may include intervals of significantly reduced current or no current to better measure the EMF and plasma parameters. Electric current in the tether may be varied to produce a desired cumulative variation of orbital elements over a given period of time.

The direction and/or path of electric current in the tether may be changed as needed. This may be done by switching from electron collection at one location to electron collection at another location when the electric current direction is reversed. Intervals of significantly reduced current or no current may be provided to better measure the EMF and plasma parameters.

Either electron collection, or emission, or both, may occur at more than one location along the tether at the same time. This allows for better control of spin dynamics by varying electromagnetic torque of the tether.

The tether system of the present invention can operate without substantial energy storage. In eclipse, the electric current in the tether can be controlled in such a way as to utilize power from EMF. Limited energy storage can be used to store energy during one portion of a spin and release it during another portion of the spin. A higher capacity energy storage can be used to store energy during one portion of an orbit and release it during another portion of the orbit.

The spin axis of the tether system can be at an arbitrary angle to its orbital plane. There can be a gradual variation of spin axis orientation during operation. Further, there can be a gradual variation of the spin rate during operation. Further, there can be a gradual variation of spin phase during operation.

The system can adjust the following parameters: spin axis, spin rate and spin phase by varying direction, duration, amount, and path-length of current flow through the tether. The spin axis orientation can be adjusted to increase solar energy collection. The spin rate can be adjusted to provide a desired level of artificial gravity at one or more locations in the tether system.

Centrifugal force induced by spinning assists tether deployment. Preferably, a minimum pull-out tension is used to prevent tether slackness and keep the tether system spinning during deployment. Electromagnetic torque may also be used to assist tether deployment. The current may be varied in the tether to produce a desired cumulative variation of orbital elements over a given period of time.

Spinning may be utilized to provide a higher thrust. Spinning may also be utilized to provide a higher rate of change of orbital elements.

The solar energy collector is preferably rotated about the tether to improve power output depending on a spin angle. Centrifugal force provides stabilization of the solar energy collector.

It is a primary object of the present invention to describe spinning (fast-rotating) electrodynamic tether systems and methods of their use.

It is a primary advantage of the present invention that spinning electrodynamic tether systems can perform much better than conventional non-spinning systems and their design can be much more economical and efficient.

Other objects, advantages and novel features, and further scope of the applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

In the following detailed description of the invention, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to spinning (fast-rotating) electrodynamic tethers. Electrodynamic tethers, also known as conducting tethers, are fully are partially made of conducting materials, or may use conductive coatings. Electric current can flow through such a tether (or some segments of the tether) closing the circuit through ambient plasma in a magnetic field. The conductivity provides for energy transfer (e.g. of electrical power into mechanical energy of motion) and data transmission (e.g. sensor data or command signals). For energy transfer applications, the tether acts as motor or generator and exerts forces upon the vehicle or object to which it is attached.

System Components

Figure 1:
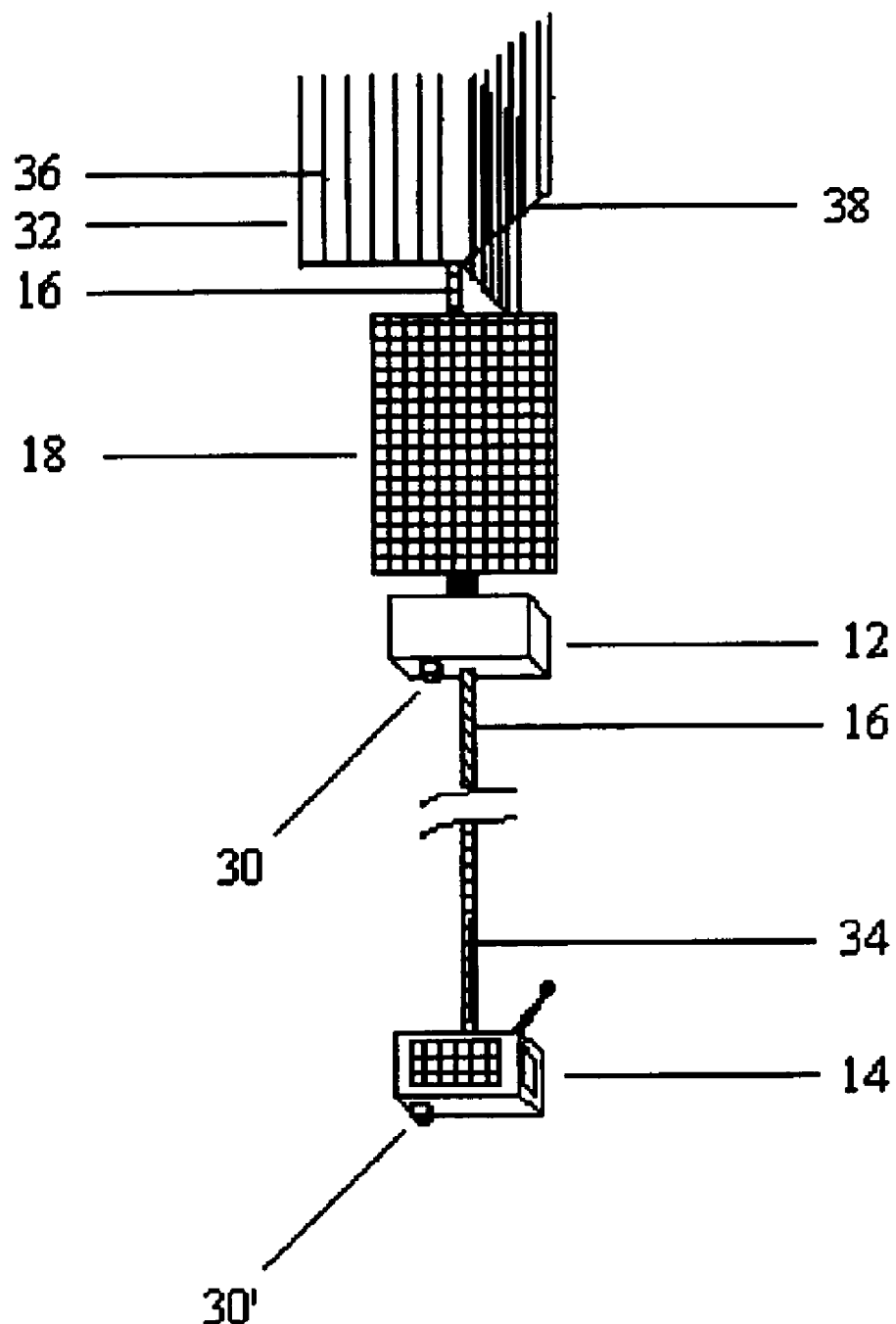
FIG. 1 is an illustration showing one embodiment of an electrodynamic tether system.
Figure 2:
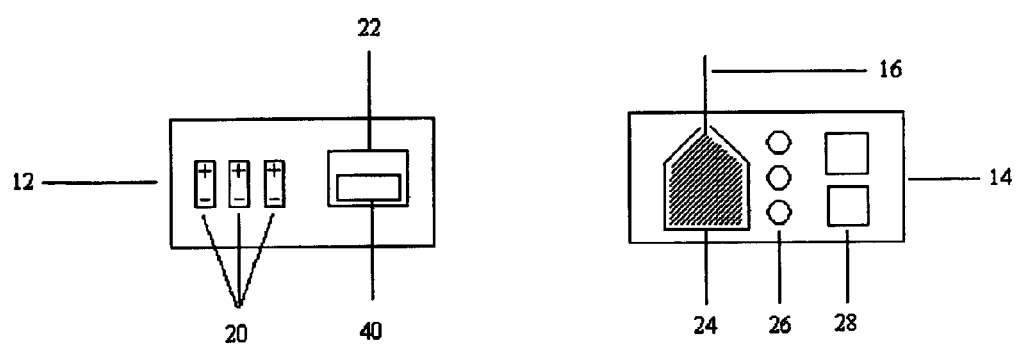
FIG. 2 is an illustration showing internal components of the end-bodies of the tether system.

FIGS. 1 and 2 illustrate one embodiment of vehicle 10 capable of operating in a spinning mode in accordance with the present invention. Vehicle 10 comprises two structures, high power end 12 and low power end 14, connected by a meteoroid-resistant, electrically bi-directional tether 16. High-power end 12 houses solar array 18, batteries 20, and power supply 22. Low-power end 14 houses deployer 24, diagnostic instrumentation 26, and payloads 28. Each end 12, 14 includes avionics and telemetry for communications, including a GPS receiver for navigation and a computer for command and control. Each end 12, 14 also includes emitters 30, 30' and electron collectors 32, 34. Vehicle 10 may use thin-film solar arrays 18 and lightweight batteries 20. A sample mass budget by subsystem and some details of suitable components are described by J. Pearson, E. Levin, J. Oldson, and J. Carroll in "The ElectroDynamic Delivery Experiment (EDDE)," Space Technology and Applications International Forum, Albuquerque, N. Mex., Feb. 11–14, 2001, the teachings of which are incorporated herein by reference.

Tether 16 may be multi-stranded, flattened, a hollow cylinder, or a thin tape in order to reduce the risk of failure from micrometeoroids to an acceptably low level, although single strand tethers may also be used in limited applications. An excellent discussion of types of tethers, useful in accordance with the present invention, is given in U.S. Pat. No. 6,173,922, to Hoyt et al., entitled "Failure Resistant Multiline Tether," issued Jan. 16, 2001, the teachings of which are incorporated herein by reference.

In the embodiment shown in FIG. 1, a multi-strand caduceus tether is shown. For minimum tether mass, the preferred material is aluminum, which has about twice the conductivity per unit mass of copper, although other conductive materials may be used in accordance with the present invention. The tether often needs to be insulated. The insulation can add appreciably to the tether mass. But the insulation can help pay for itself by raising the tether's thermal emittance and hence reducing its temperature and hence electrical resistance.

The tether may operate unidirectionally or bi-directionally. For bi-directional operation, one must provide a way of switching electron collection and electron emission from one end to the other, e.g., by duplicating emitters 30, 30' and collectors 32, 34 on each end. Hollow cathode emitters 30, 30' are approximately shoebox size, and include a gas supply and plumbing to provide improved ionospheric plasma contact. For missions up to at least six months, a 10 kg weight for a pair of hollow cathode systems is suitable. Existing designs are available from the ProSEDS program and the space station application. The tether can be of any length, but typically on the order of 1–10 km. In practice, the tether should be long enough for electron collection and emission voltages not to be dominant, but not too long for the implications of high-voltage issues to become dominant.

Although FIG. 1 illustrates hollow cathode electron emitters 30, 30', other emitters may be used in accordance with the present invention. Such emitters include thermionic wire segments, field emitter array cathodes (FEACs) and photocathodes.

Thermionic wire segments have multiple (e.g. 10) separately switched and monitored wire segments. They come in many configurations. Each takes a certain amount of heating power (e.g. approximately 10 W for 0.2×100 mm ThO/W at 1750K). One can use as many as needed to emit the desired current at any time, using enough emitting segments to keep space charge losses low and limit sputtering of the wire segments by ionized oxygen, while not wasting energy heating more segments than necessary. Barium scandale and other oxidation-resistant low work function coatings may be useful.

FEACs may require significantly less power than thermionics. MEMS arrays are generally approximately 1×1 mm and include millions of emitting tips. They may be suited for long-term use, if the tips can be kept from being damaged by sputtering from ionized oxygen in the surrounding environment.

Photocathodes work only in the sun. They can be integrated into the collector, allowing a longer current path at less power. Negative-electron affinity semiconductors are needed with a bandgap less than about 3.5 eV and resistance to low levels of neutral and ionized atomic oxygen.

In the embodiment shown in FIG. 1, the apparatus of the present invention uses electron collectors 32, 34 at each end, since bi-directional operation is preferable for an electrodynamic system in spinning mode. In a sample system, collectors 32, 34 are designed for about 60 $m^2$ per kilowatt of power.

In some systems, multiple separated strands may be required because each strand needs to be relatively narrow (on the order of a few Debye radii) to be most effective. Open net-like collectors are useful in accordance with the present invention. These have ligaments spaced at distances many times the width of each ligament. If the ligament separation distances are at least many times (e.g., 10×) their width, mutual interference in electron collection should generally be low. The present invention preferably uses two multiple-element collectors 32, 34. Electron collector 3 at high-power end 12 comprises ribs 38 (e.g. aluminum ribs) splayed radially outward from tether 16, with long members 36 hanging from them like the tines of a lawn rake. This "lawn rake" or net-like collector 32 is very lightweight and efficient, and is ideally suited to non-retractable tether systems. Collector 32 may be oriented for reduced drag.

At low-power end 14, collector 34 forms the last length (e.g. 400 meters) of conducting tether 16. A two-element caduceus is preferably used (e.g. with each element being 30 mm wide, for a total collecting area of 48 $m^2$). Other types of collectors, known in the art, may be used in accordance with the present invention. A portion (e.g. 8 $m^2$) of collector 34 is preferably coated for emittance, to keep the temperature down. This collector 34 is preferably located on the tether side of low-power end 14, leaving that end 14 of vehicle 10 free (e.g. to rendezvous with other satellites).

In a preferred embodiment, vehicle 10 comprises high-voltage solar array 18, a four-quadrant DC-to-DC power converter 40, and batteries 20 for energy storage and leveling, shown in FIG. 2.

For a power output of a few kW, a preferred choice for solar array 18 comprises conventional gallium arsenide based, multi-junction arrays. Using the data from the Hughes Spectrolab website, arrays of 2 kW have an efficiency of 22%, weigh about 1.9 kg/$m^2$ and have a power/area ratio of 300 W/$m^2$. For 2 kW power, this requires an area of 6.7 $m^2$ and weighs 12.7 kg. Allowing about a 50% increment for deployment and panel construction gives a total of about 20 kg. The potential mass savings of these new thin-film solar arrays are impressive, and results in a weight reduction of several kilograms. Guha et al. (1999) report a specific power of over 2400 W/kg for lightweight amorphous silicon arrays. If performance approaching these levels can be realized at a reasonable price, it may make more sense to use a larger array and drive the tether far harder, than to reduce the solar array weight much. Even allowing for extra power conductors and structure, a few kilograms mass is suitable with thin-film arrays. As can be appreciated by those skilled in the art, other types of solar arrays and solar energy collection means, as well as other power sources, can be used in accordance with the present invention.

DC/DC power converter 40 provides power to tether 16 needed for orbital changes, which varies with the orbital position. This requires a variable voltage and current (e.g. −500 V to +1500 V at currents up to 5–6 A) to move the power back and forth between tether 16 and the low-voltage battery 20 as efficiently as possible. The power system must be properly sized to meet mission requirements, taking into account the power available during sunlight, the power available from the batteries during darkness, and the power losses from the tether electrical resistance (ohmic losses) and from the less than perfect efficiency of the electron capture and emission (contactor losses). The power system must also be able to vary the tether current for tether rotation control.

With the spinning tether of the present invention, less storage in batteries is required. In various embodiments, batteries 20 are a key component of the baseline system, which is designed to operate in a bi-directional mode, where energy extracted by tether 16 is stored for later use. Batteries 20 allow operation in the motor mode during eclipses. They should allow fact charge/discharge during a large number of cycles. Currently, the best available system for LEO is nickel-hydrogen. The nominal 60-Ampere-hour Eagle-Picher (www.spi.tech.com) Single Pressure Vessel battery has about a 60 W-hr/kg specific energy at full discharge, or about 18 W-hr/kg at an assumed 30% depth of discharge. In a sample system, a 30 kg battery can provide storage of about 1.7 kW-hr, allowing the desired load leveling and regenerative storage of power.

Other battery types and other energy storage methods are optionally suitable for use in various embodiments of the present invention. For example, lithium ion batteries have higher power/mass ratios, but need to meet the cycle requirements for LEO applications. Flywheel energy storage can meet the high number of fast cycles, but this technology is not nearly as mature as battery technology.

The design of deployer 24, shown in FIG. 2, needs to be suited to missions of interest. A SEDS-type one-shot deployer compatible with the wire tether and collector of the present invention can be used for deployment on certain missions. Such deployer was described by J. A. Carroll and J. C Oldson, in "SEDS Characteristics and Capabilities", 4th International Tether Conference, Washington, D.C., 1995.

Another option is the PMG deployer, which was explicitly designed for deploying wire in space.

A caduceus tether lends itself to a reel deployer. Another alternative is to pull the tether out of a "jellyroll" packaging that uses a weak adhesive or other means to bond the wound package together. Then, the springiness of the wire doesn't cause it to unwind in place like a clockspring if the tether goes momentarily slack during deployment.

Deployment of a Spinning System

Spinning provides a great assist in tether deployment. To start deploying tether 16, cold-gas thrusts or electromagnetic torques first spin up connected end-bodies 12, 14. When the centrifugal force reaches the required minimum, end-bodies 12, 14 are released, and tether 16 is pulled out by centrifugal forces. The spin rate tends to decrease with tether deployment because the system inertia increases. To counteract the slowdown, cold-gas thrusters or the electrodynamic torque on the tether can be used periodically to spin the system up and assist deployment. A system deployed in such a way is literally "born spinning."

This approach works well with a "jellyroll" packaging of the tether, when a weak adhesive, like low-outgassing vacuum grease, is used to keep the tether turns together. A certain minimum tension is required to unwind a weakly bonded jellyroll. This ensures that if lower tension occurs, the still-stowed length of metal tether does not unwind in place like a clockspring. When during deployment the system spin slows down to such an extent that the centrifugally induced tether tension drops below the minimum, tether deployment stops until the system gains its spin rate with the help of cold-gas thrusters, or electrodynamic torque on the tether, or other means. Thus, periods of letter deployment will be interrupted by periods of building up angular momentum and settling disturbances in tether dynamics. Any residual disturbances that result in tension peaks will be strongly damped, since their energy will be drained into unwinding of additional wire, even if the average tension at the given period is too low for continuous deployment. This behavior allows this deployment scheme to limit its own dynamics to tolerable levels even without active control.

The same deployment strategy can be used with reels or other deployers, wherever it is technically possible to provide some reasonable minimum pull-out tension for the tether.

Figure 3:
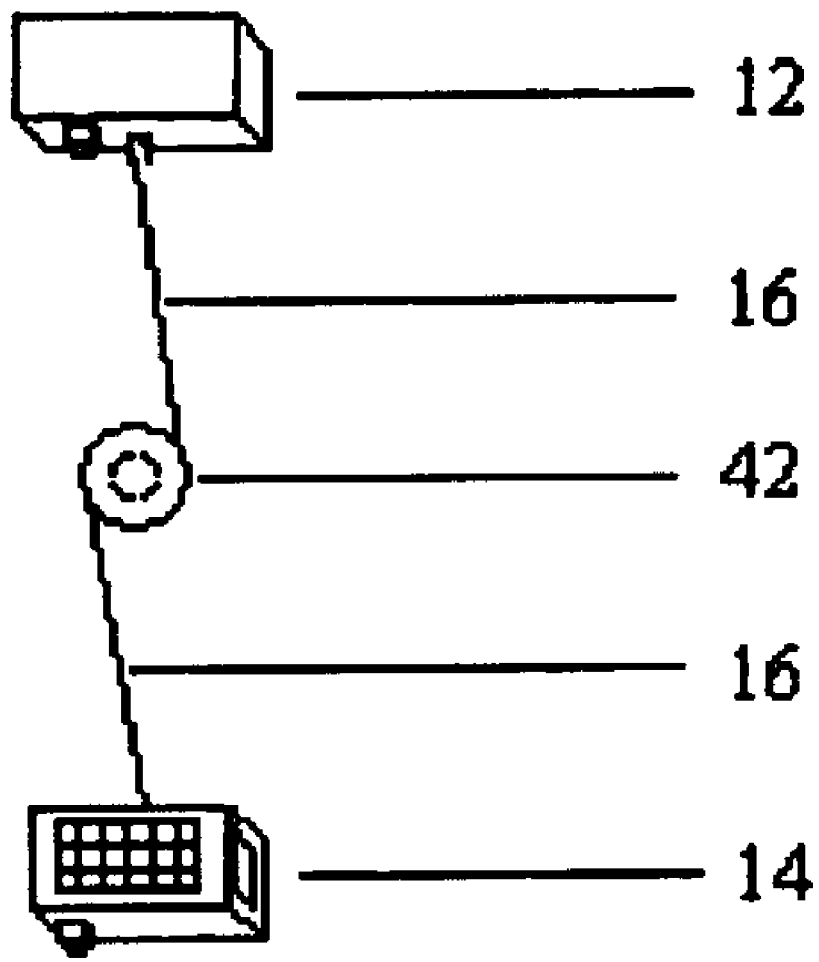
FIG. 3 illustrates one method of deployment of a spinning tether system.

In one embodiment, the tether 16 can be pulled out of said "jellyroll"-type package 42 from both ends 12 and 14, as shown in FIG. 3.

Spinning can also assist the deployment and stabilization of solar arrays and collectors from the end-bodies by providing centrifugal forces to unfold and keep these structures in place.

Operation in a Spinning Mode

Figure 4:
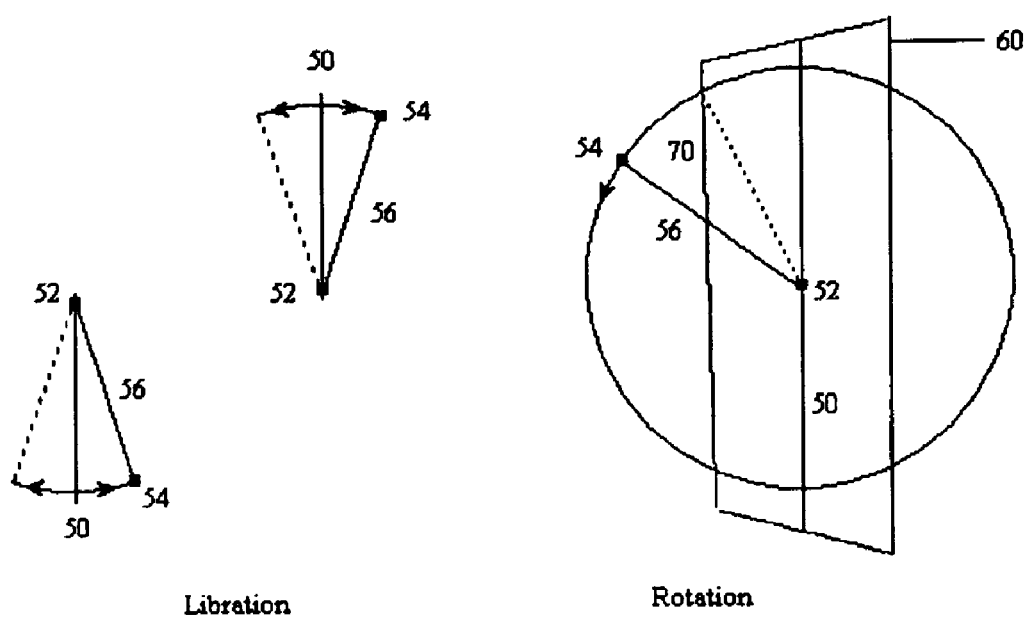
FIG. 4 illustrates the difference between spinning and non-spinning (hanging) tethers.

It is well known in the art that there are generally two types of attitude motion of tether systems in orbit: libration and rotation. FIG. 4 illustrates the difference for a system of two spacecraft, 52 and 54, connected with a tether 56. The trajectories of relative motion are shown with respect to spacecraft 52.

In libration, tether 56 is hanging always downward or always upward, as viewed from each tethered spacecraft, so that spacecraft 52 is either always above or always below spacecraft 54, and the tether oscillates in the vicinity of an average equilibrium position, which coincides with the local vertical 50 in the absence of perturbations. A librating tether is stabilized mostly be the gravity gradient, which is fairly weak, about 0.4 milligee per kilometer of displacement from the center of mass of the tether system in low Earth orbit.

In rotation, the angle 70 between the tether 56 and a plane 60 drawn through the local vertical 50 is continuously changing in one direction, and depending on this angle, each spacecraft is periodically found below or above the other spacecraft, both spacecraft constantly switching positions with rotation. A rotating tether is stabilized mostly be the centrifugal forces. These forces can be several orders of magnitude larger than the gravity gradient and can be adjusted as needed. For example, they can be as large at the beginning of deployment as at the end. This is infeasible in non-spinning deployments such as used on ATEx.

For the purpose of the present invention, spinning is defined as a rotation that is on average at least about two times faster than the orbital revolution relative to inertial space.

In the preferred embodiment, the tether spins at an angular rate an order of magnitude higher than the orbital rate. In each particular application, the spin rate must be chosen after considering performance and design trade-offs. It may be only a few times higher than the orbital rate, or a few dozen times higher, depending on the mission and system parameters.

The spin axis is not necessarily normal to the orbital plane. The orientation of the spin axis with respect to the orbital plane is chosen as best suited for a particular mission.

Throughout the mission, the evolution of the spin axis orientation, the average spin rate, and spin phase are controlled by modulations of the electrodynamic torques produced by variations in the electric current. The spin control current variations are chosen in such a way as to optimize the electrodynamic tether performance, while maintaining its stability.

Because of the spinning, the EMF induced in the tether typically changes direction twice every revolution. The electric current typically must also change direction with tether rotation in such a way as to optimize variations of desired orbital elements, or optimize power generation. The onboard power sources may be periodically used to maintain the current of desired magnitude and direction. When the current flows in the direction of the EMF, the batteries can be recharged. Every time the current must change direction, the electric switches from electron collection on one end to electron collection on the other end. The electron emission is switched correspondingly.

Because the tether orientation with respect to the magnetic field is continuously changing and the current in the tether is the primary control output for controlling all types of motion, the long-term evolution of the orbital and spin parameters is defined by a cumulative effect of the Ampere forces over periods of time longer or much longer than the spin period. Short-term oscillations of the dynamic and electrical parameters of the system, with periods shorter or much shorter that the spin period, are normally superimposed on the long-term evolution.

The overall performance of a spinning system is often best estimated by averaging over a period of one day because there are several groups of factors, some changing with the spin period, some with the orbital period, and environmental factors changing with the Earth's rotation.

Spinning electrodynamic tether systems can fly a variety of missions, taking advantage of their propellantless propulsion method and virtually unlimited delta V. They can repeatedly go from orbit to orbit, with or without payloads, dramatically changing orbital elements in a matter of weeks, and keeping all inclinations within reach.

Advantages of Spinning

The performance of most non-spinning electrodynamic tethers is strongly constrained by dynamic instabilities. Spinning radically improves tether stability, enough to eliminate these constraints and allow the system to be driven far harder and to be simpler and more effective in design and more robust in operation.

When current is applied to a hanging (non-spinning) electrodynamic tether, the Ampere forces excite libration and vibration modes. The electric current in the tether is not only limited by the available power, electron collection voltage, and other limitations of the electric system, but it is also limited by the dynamic impact of the Ampere forces on the motion of the system in general, and the tether, in particular. With relatively small currents, tether motion can be controlled by small variations of the electric current. With relatively large currents, the system can become unstable. Subject to limitations of stability, electron collection, and available power, each tether system and each mode of operation has a well-defined maximum of realistically achievable efficiency, which provides an objective comparison of different systems and modes of operation.

Figure 5:
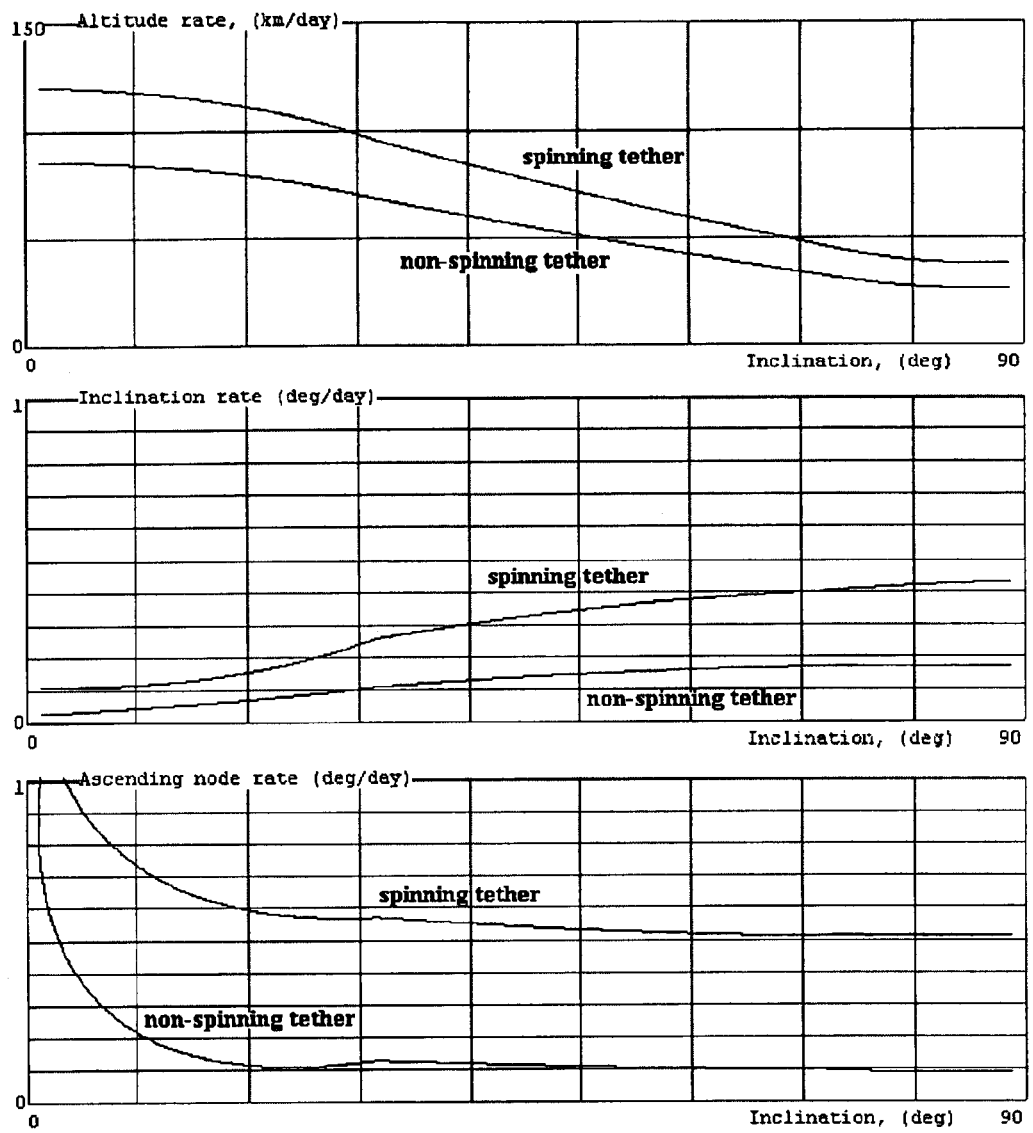
FIG. 5 is a chart illustrating superior performance of a spinning electrodynamic tether system compared to a similar non-spinning system.

FIG. 5 illustrates superior performance of the system described in the aforementioned preferred embodiment when operating in the spinning mode as compared to the non-spinning mode. The results are obtained in a very detailed computer simulation, taking into account the complexity of the geomagnetic field, ionosphere, electron collection and emission, and flexible tether dynamics. In this example, the electrodynamic tether is used for propulsion.

Improved stability is not the only reason why spinning electrodynamic tether systems can perform better than systems with hanging (non-spinning) tethers.

An electrodynamic tether hanging vertically uses only the horizontal component of the Earth's magnetic field, and provides thrust that is approximately east-west, whether it is desired or not. Hanging tethers do librate, but libration frequencies are not well suited for allowing substantial sustained use of the vertical component of the field, which is generally larger than the horizontal component.

By contrast, spinning tethers can make use of both the horizontal and the vertical components, at different periods of each spin. And since the desired thrust direction will usually vary around the orbit, the current flow phasing can be adjusted as needed around the orbit. This gives spinning systems far more operational flexibility in orbit changes than hanging systems have. This flexibility provides net improvements in efficiency in many cases. For example, at high latitudes, the geomagnetic field is almost vertical and there is not much use of a hanging tether because of a relatively small angle between the tether and the magnetic field. At the same time, a spinning tether will repeatedly be at favorable angles with the magnetic field in certain periods of the spin, and therefore can produce a much higher thrust. Note that the thrust is much higher not just during peak conditions, but also on average over the orbit.

One of the worst drivers of dynamic instability in hanging tethers is variation in thrust between sunlight and eclipse, whether due to differences in available power or ambient plasma density. Minimizing the severity of the dynamic stability constraint usually requires providing roughly the same thrust in sunlight and eclipse. This typically requires heavy batteries or other devices to provide power in eclipse. Such devices are often the heaviest part of the system.

Spinning eliminates this need for keeping the thrust in sunlight and eclipse comparable, and hence the need for heavy batteries. Spinning also provides an easy way to provide boost or deboost in a "daytime power only" mode without also incurring large undesired changes in eccentricity. It does this by using the periods when the tether is roughly horizontal, to provide up and down forces to control the eccentricity as needed. This could not be done except to a very limited extent with hanging tethers, even if they did not have stability problems. A spinning system operating in a "daytime power only" mode does not need heavy batteries, and may weigh only a few kilograms, while delivering high orbit change rates.

Spinning greatly facilitates deployment. Tether tension induced by centrifugal forces, especially at the beginning of tether deployment, eliminates the often-troublesome low-tension early phase of tether deployment that must be executed in hanging (non-spinning) systems. Simple and robust deployment techniques, like pulling the tether out of a "jellyroll" (weak adhesive) packaging, become feasible with spinning.

Spinning simplifies deployment and stabilization of not just the wire and electron collectors, but also suitable types of lightweight solar arrays. The centrifugal force eliminates any need for a rigid support structure, and hence allows the arrays to be simpler, cheaper, lighter, and more reliable.

The centrifugal stabilization of solar arrays is 3-axial, with the tendency of the plane of the array to be parallel to the spin plane and the center of mass of the array to position on the extension of the tether line. Remarkably, the natural frequency of oscillations of the array about the tether line is close to the spin rate, which makes it much easier to better track the sun during each spin. Full synchronization between spinning and solar array rotation can be achieved with the help of magneto-torquers.

In summary, spinning allows to design electrodynamic tether systems that can be far lighter and simpler and more robust, while providing far higher thrust. This makes them cheaper to build and much cheaper to launch.

The far higher thrust and far lower mass of spinning electrodynamic tether systems enable missions that previously appeared quite infeasible or uneconomic, such as delivering satellites to ISS for repair or refurbishment, delivering picosat inspectors to existing high-value satellites to retrofit them with improved situational awareness, and to cost-effectively collect, shepherd, and/or controllably deorbit space debris.

One of the operational advantages of spinning electrodynamic tether systems is that the average air drag on a spinning tether is typically 30% lower than on a similar hanging tether. This means less electrodynamic thrust to maintain the orbit. Spinning also allows the tether to remain stable under the effect of substantial air drag forces in low perigee orbits, thus extending the operational envelope to lower altitudes.

Another operational advantage is that a payload released from a spinning tether system receives an additional delta V because of spinning. For example, in a process of removing space debris from orbit, a modest-length spinning electrodynamic tether can throw objects up to several times its own mass into trajectories with low enough perigees to ensure a controlled reentry, while reboosting itself into a higher orbit. This is far harder to do with hanging tethers, unless they are impractically long for this job.

To take full advantage of spinning, the electrodynamic tether system must preferably be in a low Earth orbit, below approximately 2000 km, where the magnetic field is strong enough and plasma density is not very low to support reasonably effective electrodynamic tether operation along the orbit.

Accordingly, the present invention comprises methods and apparatus, including but not limited.

A method of improving performance and design of electrodynamic tethers by operating them in a spinning mode, when the spinning is maintained for a number orbits, the orientation of the spin axis is controlled according to the mission goals, and the electric current in the tether changes direction and/or path as needed, depending on the tether orientation with respect to the magnetic field, and in such a way as to optimize propulsion or power generation within the limits of stability and capabilities of the electric system; and An apparatus operating in a spinning mode, including satellite or satellites with attached conductive tether or tethers, equipped with power sources, electron collectors and emitters, capable of reversing the electric current in the tether by switching from electron collection at one location along the tether to electron collection at another location, and similarly switching electron emission locations, as required by the aforementioned method.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein.

What is claimed is:

1. A tether system for space applications in low Earth orbit comprising:
   at least one electron collector;
   at least one electron emitter;
   a power system;
   at least one spinning electrodynamic tether, electrically coupled to the power system, said tether configured to conduct electrical current between said at least one electron collector and said at least one electron emitter and to spin; and
   an electric control system, said control system maintains a continuous spinning of said tether at an average rate exceeding approximately two times an orbital angular rate with respect to inertial space by controlling the electric current in said tether, wherein said control system is configured to maintain the continuous spinning to improve tether stability and electrodynamic performance by reducing operational constraints relative to non-spinning tethers.

2. The tether system of claim 1 wherein said spinning electrodynamic tether comprises at least one type of tether selected from the group consisting of multi-strand tethers, flattened tethers, hollow tethers, and thin tape tethers.

3. The tether system of claim 1 comprising a bi-directional system, wherein the electric current in said tether is driveable in both directions in some or all segments of said tether.

4. The tether system of claim 1 comprising at least two electron collectors disposed at distinct locations and at least two electron emitters disposed at distinct locations.

5. The tether system of claim 1 wherein said electron collector comprises a net-like collector.

6. The tether system of claim 1 comprising a solar energy collector.

7. The tether system of claim 6 wherein said solar energy collector comprises a solar array.

8. The tether system of claim 7 comprising a thin-film solar array.

9. The tether system of claim 7 comprising a centrifugally-stabilized solar array.

10. The tether system of claim 1 comprising an energy storage device.

11. The tether system of claim 10 wherein said energy storage device has a capacity to provide energy for a portion of a spin.

12. The tether system of claim 10 wherein said energy storage device has a capacity to provide energy for a duration of an eclipse.

13. The tether system of claim 1 further comprising a deployer.

14. The tether system of claim 13 wherein said tether is stored in said deployer using turns and said turns are fastened in such a way that a minimum tension is required to unwind said tether turns from said deployer.

15. The tether system of claim 14 wherein said tether turns stored in said deployer are bound with a weak adhesive.

16. The tether system of claim 15 wherein said tether turns stored in said deployer are bound with a vacuum grease.

17. The tether system of claim 13 wherein one or more segments of said tether have both ends of a wound segment at an outside of a winding, with said ends exposed and each end attached to a separate object and said both ends are deployed simultaneously.

18. The tether system of claim 13 wherein said deployer provides full or partial retraction of said tether.

19. The tether system of claim 1 comprising multiple tethers wherein said tethers form a configuration selected from the group consisting of a triangular configuration, a polygonal configuration, and a polyhedronal configuration.

20. A method for operating a spinning electrodynamic tether system, the method comprising the steps of:
   spinning an electrodynamic tether in low Earth orbit; and
   controlling an electric current in the tether to maintain a continuous spinning of the tether at an average rate exceeding approximately two times an orbital angular rate of the low Earth orbit, wherein the continuous spinning improves tether stability and electrodynamic performance by reducing operational constraints relative to non-spinning tethers.

21. The method of claim 20 comprising the step of varying electric current in the tether as a primary control output.

22. The method of claim 20 further comprising the step of changing direction of electric current in the teather.

23. The method of claim 22 comprising the step of switching from electron collection at one location to electron collection at another location when the electric current direction is reversed.

24. The method of claim 21 wherein the step of varying the electric current comprises providing intervals of significantly reduced current or no current to better measure EMF and plasma parameters.

25. The method claim 20 wherein either electron collection, or emission, or both, occurs at more than one location along the tether at a same time, to allow better control of spin dynamics by varying electromagnetic torque on the tether.

26. The method of claim 20 wherein no substantial energy storage is used, and in eclipse, the electric current in the tether is controlled to utilize power from EMF.

27. The method of claim 20 wherein limited energy storage is used to store energy during one portion of a spin and release it during another portion of the spin.

28. The method of claim 20 wherein energy storage is used to store energy during one portion of an orbit and release it during another portion of the orbit.

29. The method of claim 20 wherein a spin axis of the tether system is at an arbitrary angle to its orbital plane.

30. The method of claim 20 comprising gradual variation of a spin axis orientation during operation.

31. The method of claim 20 comprising gradual variation of the spin rate during operation.

32. The method of claim 20 comprising gradual variation of a spin phase during operation.

33. The method of claim 20 comprising adjusting at least one parameter selected from the group consisting of spin axis, spin rate and spin phase by varying at least one parameter selected from the group consisting of direction, duration, amount, and path-length of current flow through the tether.

34. The method of claim 20 comprising the step of adjusting a spin axis orientation to increase solar energy collection.

35. The method of claim 20 comprising the step of adjusting the spin rate to provide a desired level or artificial gravity at one or more locations in the tether system.

36. The method of claim 20 comprising the step of using centrifugal force induced by spinning to assist tether deployment.

37. The method of claim 36 comprising the step of using a minimum pull-out tension to prevent tether slackness and keep the tether system spinning during deployment.

38. The method of claim 36 comprising the step of using electromagnetic torque to assist tether deployment.

39. The method of claim 20 comprising the step of varying electric current in the tether to produce a desired cumulative variation of orbital elements over a given period of time.

40. The method of claim 20 comprising the step of utilizing spinning to provide a higher thrust.

41. The method of claim 20 further comprising the step of utilizing spinning to provide a higher rate of change of orbital elements.

42. The method of claim 20 further comprising the step of providing a solar energy collector.

43. The method of claim 42 comprising the step of providing solar energy collector stabilization by centrifugal force.

44. The method of claim 42 comprising the step of rotating the solar energy collector about the tether to improve power output depending on a spin angle.

45. The tether system of claim 1, wherein the electric control system is adapted to maintain the spinning to increase average long-term orbit transfer and power generation rates.

* * * * *